United States Patent
Hagar et al.

(10) Patent No.: US 8,812,531 B2
(45) Date of Patent: *Aug. 19, 2014

(54) CONCEPT BRIDGE AND METHOD OF OPERATING THE SAME

(71) Applicants: David Adam Hagar, Dallas, TX (US); Stephen Scott Jernigan, Murphy, TX (US); David Seigert Copps, Dallas, TX (US)

(72) Inventors: David Adam Hagar, Dallas, TX (US); Stephen Scott Jernigan, Murphy, TX (US); David Seigert Copps, Dallas, TX (US)

(73) Assignee: PureDiscovery, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,584

(22) Filed: Nov. 6, 2012

(65) Prior Publication Data

US 2013/0066845 A1     Mar. 14, 2013

Related U.S. Application Data

(63) Continuation of application No. 11/472,026, filed on Jun. 21, 2006, now Pat. No. 8,312,034.

(60) Provisional application No. 60/693,880, filed on Jun. 24, 2005.

(51) Int. Cl.
    *G06F 17/30*     (2006.01)

(52) U.S. Cl.
    USPC ........................................ 707/765

(58) Field of Classification Search
    None
    See application file for complete search history.

(56) References Cited

U.S. PATENT DOCUMENTS

| | | | |
|---|---|---|---|
| 4,839,853 A | 6/1989 | Deerwester et al. | |
| 5,278,980 A | 1/1994 | Pedersen et al. | |
| 5,819,258 A * | 10/1998 | Vaithyanathan et al. | ..... 707/692 |
| 5,987,446 A | 11/1999 | Corey et al. | |
| 6,510,406 B1 | 1/2003 | Marchisio | |
| 6,523,026 B1 * | 2/2003 | Gillis | ..... 1/1 |
| 6,611,825 B1 | 8/2003 | Billheimer et al. | |
| 6,678,679 B1 | 1/2004 | Bradford | |
| 6,701,305 B1 | 3/2004 | Holt et al. | |
| 6,772,170 B2 | 8/2004 | Pennock et al. | |
| 6,775,677 B1 | 8/2004 | Ando et al. | |
| 6,862,710 B1 | 3/2005 | Marchisio | |
| 7,051,017 B2 | 5/2006 | Marchisio | |
| 7,113,943 B2 | 9/2006 | Bradford et al. | |
| 7,152,065 B2 | 12/2006 | Behrens et al. | |
| 7,398,201 B2 | 7/2008 | Marchisio et al. | |
| 7,483,892 B1 | 1/2009 | Sommer et al. | |
| 2002/0103799 A1 | 8/2002 | Bradford et al. | |
| 2002/0103809 A1 | 8/2002 | Starzl et al. | |
| 2002/0138528 A1 | 9/2002 | Gong et al. | |

(Continued)

OTHER PUBLICATIONS

Deerwester, S., et al., "Indexing by Latent Semantic Analysis," Journal of the American Society for Information Science, 19990, pp. 391-407, vol. 41 No. 6, John Wiley & Sons, Inc., Hoboken, NJ.

*Primary Examiner* — Bai D. Vu

(74) *Attorney, Agent, or Firm* — Baker Botts L.L.P.

(57) ABSTRACT

A concept bridge employable with a search engine, method of operating the same and computer information system employing the concept bridge and method. In one embodiment, the concept bridge includes an extractor configured to derive concept terms by extracting significant terms from search text and inferring relevant terms therefrom. The concept bridge also includes a query generator configured to generate a query consistent with an index of a search engine as a function of the concept terms.

18 Claims, 2 Drawing Sheets

(56) References Cited

U.S. PATENT DOCUMENTS

| | | |
|---|---|---|
| 2002/0156763 A1 | 10/2002 | Marchisio |
| 2003/0004942 A1 | 1/2003 | Bird |
| 2003/0115188 A1* | 6/2003 | Srinivasa et al. .................. 707/3 |
| 2003/0225749 A1 | 12/2003 | Cox et al. |
| 2004/0059736 A1 | 3/2004 | Willse et al. |
| 2004/0064438 A1 | 4/2004 | Kostoff |
| 2004/0210443 A1 | 10/2004 | Kuhn et al. |
| 2004/0220944 A1 | 11/2004 | Behrens et al. |
| 2005/0149494 A1* | 7/2005 | Lindh et al. ..................... 707/3 |
| 2005/0228657 A1 | 10/2005 | Chou et al. |
| 2006/0047441 A1 | 3/2006 | Homayouni et al. |

\* cited by examiner

CONCEPT BRIDGE AND METHOD OF OPERATING THE SAME

RELATED APPLICATION

This application is a continuation of U.S. application Ser. No. 11/472,026, filed Jun. 21, 2006, by David Adam Hagar, et al., and entitled "Concept Bridge and Method of Operating the Same," now U.S. Pat. No. 8,312,034 B2, which claims priority to U.S. patent application Ser. No. 60/693,880, entitled "System for Creating an Index Independent Search Expression and Method Employing the Same," which was filed on Jun. 24, 2005.

TECHNICAL FIELD

The present invention is directed, in general, to computer information systems and, in particular, to a system for creating a query consistent with an index of a search engine and method employing the same.

BACKGROUND

The World Wide Web (also referred to as the "Web") is an extremely large, inter-networked data system connecting hundreds of millions of informational sites and documents and is growing daily. The inter-linked relationships between the sites create a dynamic system of enormous complexity. Despite the information or "content" dependent utility of the Web, the existing Internet addressing system does not locate or identify sites based on their information content. Thus, one of the persistent problems associated with the Web is finding useful information. Indeed, while the rich, decentralized, dynamic and diverse nature of the Web can make casual Web surfing enjoyable, it has made serious navigation aimed at finding specific information extremely difficult.

In response to the aforementioned problem, several types of Internet/Web navigation, location, finding or searching resources have evolved in an attempt to facilitate the presentation of sites based on content. One such resource relates to an automated information retrieval system, often referred to as an Internet or Web "search engine." Typical search engines involve at least two specific components. First, the search engines have a database creation component that uses automated collection agents (i.e., software programs generally called "spiders") to automatically traverse the Web to discover and collect accessible information source items independent of content. The term spider is understood here to include automated user agents, call utilities, Web robots, bots, autonomous and mobile agents dedicated to the function of automatically retrieving documents, pages, or resources either by traversing the Web or by some other means. In essence, spiders automatically traverse the Web's hypertext link structure, recursively retrieving documents, pages, or resources that are discovered and return the items (e.g., Web documents or document addresses ("URLs")) to populate a confined data structure.

Second, the search engines provide a query function or component that allows an end-user to access the populated data structure and query that data structure to retrieve resource items based on content (i.e., content related to the supplied query). This second component is referred to herein as an information retrieval system, which refers to the data structure-based functions of storage, ordering, and presenting of previously discovered and collected information, as distinct from the processes of discovery and collection of data from the Web. Thus, using an information retrieval system that has been populated with resource items through the use of a spider, end-users may supply queries to the database and, although all of the Web pages that the spider discovers and collects are stored in an undifferentiated manner, the information retrieval system can present items that generally relate to the query to the end-user.

One particular drawback associated with typical search engines relates to the fact that since the data structure portion of the information retrieval system is populated with many items that have not been filtered for content, the results of an end-user query generally have a significant number of irrelevant items. One response to the lack of relevancy in search engine results has been the development of "Web directories." The directories consist of manually created databases (as compared to the automatically created databases of information retrieval systems). People examine each page or resource and determine whether the resource should be included in the directory's database. Web directories are distinguished from search engines in that they only collect or accept content that is relevant to a topic or category within the directory. Although each directory typically has highly relevant resources, the throughput of manual processing creates directory databases that are unsatisfactorily small, on the scale both of the total Web and when compared to the size of Web search engine information retrieval system databases. Moreover, since people must manually perform the task of accepting or rejecting each and every resource, the cost of maintaining and updating the directories is significantly high.

With respect to either search engines or Web directories, an end-user supplies a query, or search criteria, in order to access information contained in a search engine information retrieval system database or a directory database. Typically, since both search engines and directories give greater weight to the keywords or phrases occurring at the beginning of a query, the order of the keywords or phrases may critically impact the amount of relevant information returned. For example, if a user was attempting to get information about his Volkswagen Golf automobile, the query "Golf and Volkswagen" may return two hundred sites dealing with the game of golf, but none dealing with automobiles. Conversely, the query "Volkswagen and Golf" may return one hundred sites dealing with automobiles, but still return one hundred irrelevant sites, dealing with the game of golf. The problem becomes worse when more keywords are added to the query. Therefore, a major problem with current search techniques is that even if a user manually inputs every combination of keywords in an attempt to retrieve relevant sites, the process may still present many irrelevant sites.

The primary reason for the presentation of irrelevant data relates to the limitations of the search engine's information retrieval system. As mentioned above, directories usually contain relevant information, but the amount of relevant information is small due to manual processing. Although it would be desirable for an information retrieval system to contain every document available by using an "unconstrained" spider, such spidering is impractical. In principle, the entire Web can be discovered and gathered using an unconstrained spider, however, in practice the process is intractable, and system resources are rapidly used up. For instance if a spider conducts a long unconstrained traversal, a large amount of memory resources are required to store the large amount of returned results. Problems associated with practical spidering of the Web include the large and highly variable number of links on different pages, the high level of self-referential and recursive linking architectures, and cyclical link paths. Furthermore, spiders do not differentiate documents based on topical content. Instead, each document that is traversed is returned to the database, creating a large, undifferentiated collection of items.

As mentioned above, if the search engine's spider is allowed to conduct an unconstrained search, an extremely large amount of information (both relevant and irrelevant) is retrieved and system memory is consumed quickly. Inasmuch as information retrieval systems have a limited memory capacity, a significant portion of the Web is left untouched by the search engines, and as a result, relevant information remains undiscovered by the user.

If possible, search engine and directory providers would like to populate their information retrieval system and directory databases with every bit of available information. Search engine and directory providers, however, must balance the desire to construct such large databases with the limitations imposed by system resources. Each provider may take a different approach to achieve this balance. As a result, each information retrieval system and directory database may be of a different size, populated with different information, and present the information to the user in different ways. Therefore, a query search entered on one search engine or directory may return different results than if the same query search was entered into a second search engine or directory. Ideally, a user would like to take advantage of the different methods for gathering, storing, and retrieving data used by each search engine or directory. Unfortunately, however, a user must typically enter each query combination into each search engine and/or directory. Furthermore, a user is required to manually filter all of the irrelevant items returned from each search engine and/or directory.

Additionally, typical search engines only provide a limited number of responses to a particular query. For example, many search engines only provide a user two hundred resources in response to a single query. The reason for the limited number of responses relates to the fact that a single user is typically unable to review hundreds or thousands of different resources that may potentially be returned in response to a query. Moreover, search engines typically have different relevancy rankings from other search engines according to predetermined criteria. Consequently, the same search on different search engines often produces different results. Thus, in order to increase the number of relevant results, multiple queries should be performed on multiple search engines.

Accordingly, what is needed in the art is a system and method that derives queries for different search engines that screens relevant information from the subject information or document to create queries applicable to the different search engines.

SUMMARY OF THE INVENTION

These and other problems are generally solved or circumvented, and technical advantages are generally achieved, by advantageous embodiments of the present invention that include a concept bridge employable with a search engine and method of operating the same. In one embodiment, the concept bridge includes an extractor configured to derive concept terms by extracting significant terms from search text and inferring relevant terms therefrom. The concept bridge also includes a query generator configured to generate a query consistent with an index of a search engine as a function of the concept terms.

In another aspect, the present invention provides a computer information system. In one embodiment, the computer information system includes a first search engine having a first index and a second search engine having a second index different from the first index. The computer information system also includes a concept bridge having an extractor configured to derive concept terms by extracting significant terms from search text and inferring relevant terms therefrom. The concept bridge also includes a query generator configured to generate a first query for the first index and a second query for the second index as a function of the concept terms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
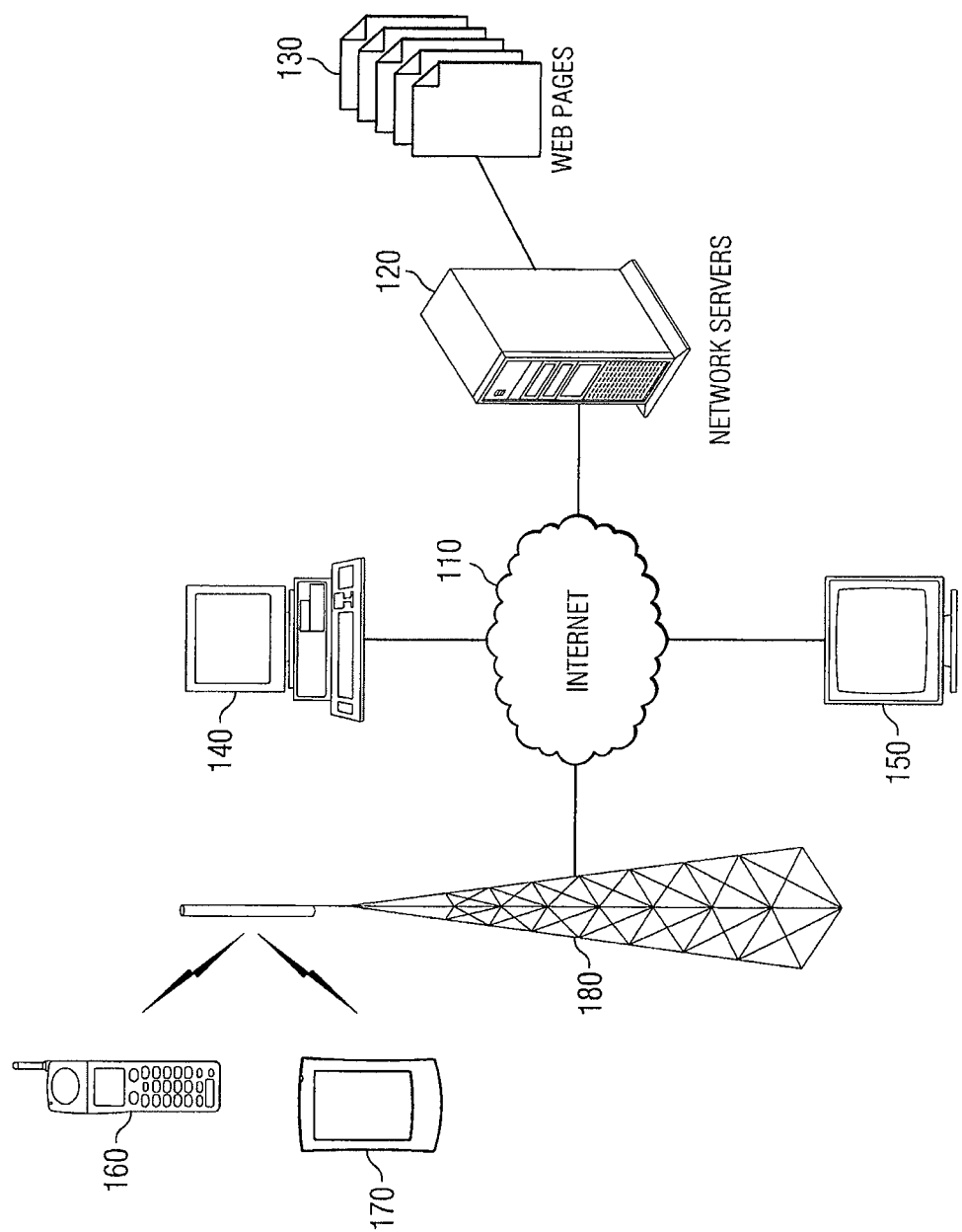
FIG. 1 illustrates a block diagram of an embodiment of a communication network constructed in accordance with the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way.

The present invention will be described with respect to an exemplary embodiment in a specific context, namely, a concept bridge. The particular embodiments described herein are applied to exemplary search engines and employ selected tools. Also, the FIGURES herein and accompanying description may use definitive language for the sake of specific examples. It should be understood that the definitive language may be replaced with permissive language in accordance with the principles of the present invention.

The concept bridge takes an example of what someone is searching for such as a document, email, or Web page, and creates a keyword Boolean expression from information extracted from, for instance, a concept matrix or concept space. The Boolean expression is tuned to an index or ranking subsystem of a specific search engine to return search results that are similar in content to the search example.

As an example, assume the search text is that China has announced details of a second outbreak of bird flu in the western region of Xinjiang. The Ministry of Agriculture said more than 400 geese had died at a farm in Tacheng, and another 13,000 birds had been culled as a precaution. Last month China announced bird flu had killed wild birds in Qinghai, its first case of the virus in nearly a year. The H5N1 virus has killed at least 53 people in South East Asia since late 2003, though no one has died in China.

Exemplary output Boolean expressions include:

1. Ranked-OR Expression: bird OR "bird flu" OR flu OR Asia OR birds OR china OR stohr OR minh OR omi OR h5n1 OR wildfowl OR Vietnam's OR shigeru OR giang OR avian OR hanoi OR ducks OR gravest OR re-assorting OR kimchi; and 2. Cluster expression: (bird OR flu) AND (Asia OR china) AND (birds OR chickens OR ducks OR leopards) AND (outbreak OR virus).

The concept bridge as described herein may employ latent semantic analysis to build a concept matrix. The latent semantic analysis is a process wherein large collections of documents are analyzed and terms are mapped to concept vectors. The concept vectors for any two documents can be compared and measured for similarity. The advantage of the concept is that the latent semantic analysis can recognize similar content between multiple documents even if the documents do not use the same terms. Also, the latent concepts can be mapped back to terms. The concept terms contain both the significant terms that were in the original document as well as relevant terms that were inferred therefrom. Concept terms are used by the concept bridge in extracting and inferring significant terms and phrases in a document. Concept vectors are used directly to rank results that are retrieved from search engines. As an example, see U.S. Pat. No. 4,839,853, entitled "Computer Information Retrieval Using Latent Semantic Structure, to Deerwester, et al, issued Jun. 13, 1989 and "Indexing by Latent Semantic Analysis," Journal of the American Society for Information Science, Vol. 41, No. 6, pp. 391-407 (1990), which are incorporated herein by reference.

Referring initially to FIG. 1, illustrated is a block diagram of an embodiment of a communication network constructed in accordance with the principles of the present invention. The communications network includes the Internet 110 and a conventional network server 120 coupled to the Internet 110. The network server 120 provides access to programs and a series of Web pages 130. The network server 120 may also host several Web sites for services or information. In other embodiments, the communications network may have any number of network servers 120 having any number of Web pages 130.

In accordance therewith, the network servers 120 may accommodate computer-accessible data sources or datasets generally designated as corpora. The corpora include datasets accessible via the Internet 110. A computer system (see below) is operable to process data selected from one or more of corpora. The one or more corpora can be accessed with a data extraction routine executed by a processor in the computer system to selectively extract information according to predefined criteria. In addition to datasets, corpora data may be acquired live or in realtime from local or remote source. The data mined in this manner can be further processed to provide one or more corresponding data processing outputs in accordance with the operating logic of the processor of the computer system.

Within the environment of the communications network is a personal computer system 140 and a wired messaging terminal 150, coupled to the Internet 110. The personal computer system 140 may be a conventional computer system having the capability to access and search the Internet 110. The personal computer system 140 may also include a conventional Internet browser.

As an example, the computer system typically includes a processor configured to operate in accordance with programming instructions and/or another form of operating logic. The processor may be integrated circuit based including one or more digital, solid-state central processing units each in the form of a microprocessor. The computer system includes input devices (e.g., mouse, keyboard, scanner) and output devices (e.g., graphic display) operatively coupled to the processor. The computer system also includes memory operatively coupled to processor operable to store programming instructions for selective execution by processor or to store data other than programming instructions for processor.

The wired messaging terminal 150 may be a conventional messaging terminal capable of sending and receiving messages via the Internet. The communication network may also include a cell telephone with display messaging capability 160 and a wireless personal digital assistant ("PDA") 170 coupled to the Internet via a transmitter 180. As will be described in more detail below, the communication network provides an environment for a computer information system including a concept bridge as herein described.

Figure 2:
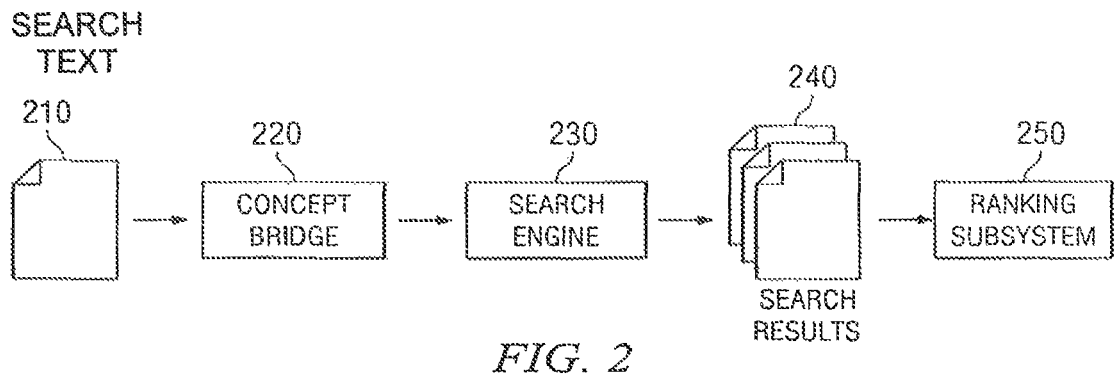
FIG. 2 illustrates a block diagram of an embodiment of a computer information system employing a concept bridge constructed according to the principles of the present invention.

Turning now to FIG. 2, illustrated is a block diagram of an embodiment of a computer information system employing a concept bridge constructed according to the principles of the present invention. The computer information system includes search text 210 such as a document and often referred to as corpora. The search text provides a source of information for a concept bridge 220 as described in detail below. In general, the concept bridge is employable with a search engine 230 and includes an extractor configured to derive concept terms by extracting significant terms from search text and inferring relevant terms therefrom. The concept bridge also includes a query generator configured to generate a query consistent with an index of a search engine as a function of the concept terms.

As is well understood, search engines 230 often employ different indices for performing specific searches. Thus, a first search engine may have a first index and a second search engine may have a second index different from the first index. The concept bridge 220 recognizes the different constructs of the search engines 230 and tailors the query to gain better results from the respective search engines 230 consistent with the respective indices. Once the query is derived, the search engine 230 performs a search on databases, Web pages, etc. accessible thereby. The computer information system also includes ranking subsystem 250 (which may be part of the search engine 230) that ranks the search results 240 provided by the search engine 230.

Figure 3:
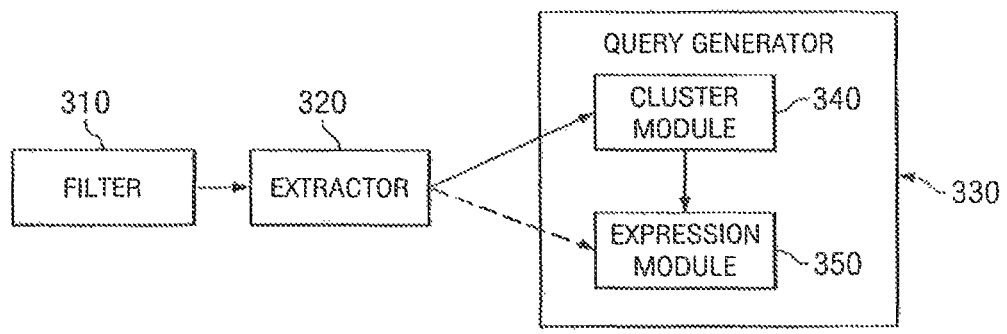
FIG. 3 illustrates a block diagram of an embodiment of a concept bridge constructed according to the principles of the present invention.

Turning now to FIG. 3, illustrated is a block diagram of an embodiment of a concept bridge constructed according to the principles of the present invention. The concept bridge includes a filter 310 that enhances the results depending on the nature of the search text. The search text is filtered to remove noise terms that are unrelated to the main theme of the search. This allows a concept matrix build process as discussed below to extract finer grained patterns that would otherwise be obscured by the noise. Search text and the documents that go into the concept matrix may be filtered to remove noise terms that are not related to the core topic of the document. Noise terms, or document noise, may be a series of characters with preceding and following white space characters that provide little or no value to the semantics of the document. Noise terms can be things like advertisements, menus, copyright notices, e-mail and Web page addresses, dates, numbers, etc. The following methods are exemplary filtering methods that are applicable.

A line features filter measures qualities such as line length, ratio of term to non-term characters, and patterns in the grouping of non-term characters to decide to remove a line. Other filters include a verb stop term list, an adverb stop term list, a common term stop list and a noun-only filter. A line spam filter may be used on lines instead of the whole document. The spam filter is trained using examples of what to remove and what to keep. A term filter removes individual terms based on the percentage of non-alphabetical characters therein, along with the frequency of the term in the document.

The concept bridge also includes an extractor 320 that extracts significant terms from the search text and infers relevant terms therefrom. The concept bridge may employ latent semantic analysis to identify significant terms in the search text and infer relevant terms such as synonyms that match the content of the search text. Given a block of text, the latent semantic analysis can produce a ranked list of concept terms that most closely represent that block of text. The concept terms may include both significant terms in the original document and the relevant terms that are inferred. The ranking scores of significant terms that occur in the document are increased by a percentage. The adjusted list of concept terms is a list of significant and relevant terms. Additionally, the significant terms in a document can be highlighted to make it easier to look through. This can include a color coding based on the term synonym clusters (see discussion below).

The process of extracting significant terms from a concept matrix often do not recognize terms that are not part of the concept matrix. Since some terms that are in the search text, but missing from the concept matrix, may be significant, a rank for these terms can be generated using metrics such as frequency of the term occurrence in the search text, capitalization of the first character of the same term, and proximity to other significant terms. If the ranking process works well, the list of ranked unknown terms can be merged with the list of significant terms for the concept terms that are used in building a concept bridge query. Additionally, the concept terms may be applied using different weights in building the concept bridge query. Thus, one concept term may be applied with a weight of 95% while another concept term is applied with a weight of 90% depending on the particular search criteria.

Phrases are sequential significant terms that typically do not cross a sentence boundary or some sentence punctuation. The phrases are given a numerical ranking based on the rank of the terms that make up the phrase. The phrases are then added to the list of significant terms and treated like concept terms by the remaining systems of the concept bridge. The concept terms and phrases may be generated by using the concept matrix. When significant terms next to each other within sentence boundaries are extracted from the search text, the significant terms are more akin to a phrase. In using the concept matrix to identify the significant terms, the process of phrase detection becomes less complex. The phrases may also be included within query expressions employed by the concept bridge.

The concept bridge also includes a query generator 330 that generates a query consistent with an index of a search engine as a function of the concept terms. In the illustrated embodiment, the query generator includes a cluster module 340 wherein the concept terms are clustered into synonym groups using, for instance, latent semantic analysis and then an operator such as an "AND" is placed between the synonym groups, thereby producing an expression that is less sensitive to the ranking subsystems of the search engines and enhances the effectiveness thereof. The following expression provides an example, namely, (workbench OR workshop OR "work area") AND (wood OR plywood OR pine OR "particle board") AND (build OR construct OR assemble OR "put together"). The processing of the search engine can be expanded to include other Boolean operators or search engine unique operators.

A variation for the cluster module 340 is to pick ahead of time the number of "OR" and "AND" terms to generate. The cluster module 340 then takes the list of ranked concept terms in the form of terms and phrases (generated by the previous module) and for each term uses it as a search into the concept matrix to generate a list of similar concept terms including terms and phrases. The cluster module 340 then takes the first N terms of the intersection of this list and the original list and this becomes its first set of "OR" terms, or terms grouped together by putting "OR" in between each term with parentheses at each end of the whole group. The cluster module 340 then removes the terms from the original list and repeats the process until the number of "AND" terms is reached.

A second variation of generating synonym groups is similar to the aforementioned technique except that the second variation does not choose the number of and/or terms ahead of time. It takes the list of concept terms and their corresponding concept vectors and does a normal "k"-means clustering on the vector for a range of values of k {e.g., K=[2, 5]}. A quality of fit score for each "k" is generated. The "k" with the best quality of fit is then used. The most relevant N terms or phrases from each cluster then forms an "OR" group that is AND'ed to all of the other "OR" groups.

In accordance with the query generator 330, if the search engine supports ranked OR searches, a search expression is created via an expression module 350 representing the top N concept terms, otherwise it is the clustered AND/OR expression as discussed above. After the Boolean expression has been generated, the search is sent to the search engine via an application program interface ("API") and the results are received and displayed. The search results can be downloaded, compared to the original search text, and conceptually ranked using, for instance, latent semantic analysis. Post processing could also include document clustering, and 2D/3D visualizations.

Regarding the concept terms as discussed above, a concept matrix may be built on information such as a sample of documents. To do this, the concept matrix automatically includes documents most relevant to searches that have been done recently and automatically removes documents that are the least relevant to any searches done recently or that are duplicates. Each document has a relevancy score that reflects its relevance to recent searches, the number of similar documents, and the length of time it has been in the system. The documents with the lowest relevance scores are removed until a size is reached that produces efficient concept matrix builds.

In some cases, there may be practical constraints on the number of documents that go into a concept matrix such as concept matrix build time, memory, and the number of dimensions therein. One way to solve this is to build multiple specialized concept matrices and one general concept matrix to facilitate the maintenance and usage of the specialized concept matrices. The multiple concept matrices are built by either clustering the documents into N concept matrices or by taking the topics being searched for on the system and clustering them into N concept matrices and adding the documents to the cluster that is most similar. Choosing which concept matrix to use in a search is a matter of picking the concept matrix that is most similar to the search text. This can be done by comparing the search topic documents used to build the concept matrix or by comparing the average concept vector or average word frequency vector for the cluster.

The extraction of significant terms typically does not recognize words that were not part of the concept matrix build. To combat this limitation, a query is formed by combining the missing term and a query generated from the document it came from. The results of the query are added to the next concept matrix build. This adds documents that use the missing term in a similar context as the original document. Since not all new terms are of equal importance, a method of ranking the terms is preferable. Relevant terms get more documents added to the concept matrix. Current ranking techniques include word frequency, word capitalization, and proximity to known relevant words.

Additionally, in an exemplary embodiment the search text does a latent semantic analysis search against a carefully chosen set of documents that have at least one document with each term in as many different contexts as possible. A vector of true/false values is then created for each of the search results. Each true/false value corresponds to the presence or absence of one of the extracted concept terms. These true/false vectors may be assembled quickly using a keyword search of the significant extracted terms and retrieving a list of all documents containing those terms. These true/false vectors now represent a very large Boolean expression that could efficiently select search results in a conceptual way.

Figure 4:
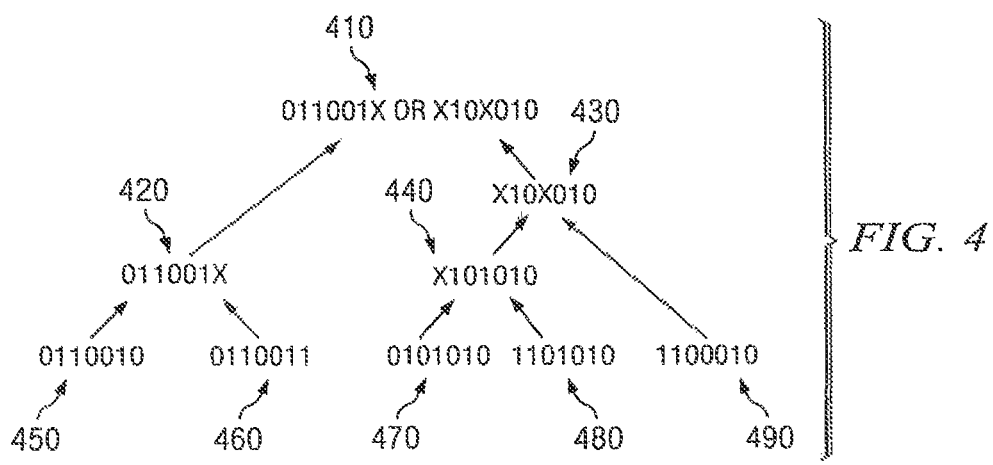
FIG. 4 illustrates a diagram of an embodiment of tree structure employable to refine an expression for a query in accordance with the principles of the present invention.

As illustrated with respect to FIG. 4, in the event wherein the Boolean expression generated by the previous step is too large to send to a search engine, it is possible to simplify or refine the expression to an approximate expression that functions almost as well. The process is to merge terms in a tree structure starting with the most similar terms first and continuing until the expression is simplified enough. The Boolean vectors in the final simplified expression are converted into "AND" expressions where a "1" is replaced by the term it represents and "0" is replaced by NOT and the term it represents (X's are not included). The "AND" terms are then OR'ed together.

The concept bridge may be employed in many applications such as being driven by text in a Web browser. A tool bar communicates with a central server that receives the search text and returns the search results generated by a concept bridge query against one or more search engines. Alternatively, the search can be triggered automatically in the background on any text viewed and the results displayed to the side of the window.

The concept bridge can be given a set of example documents that are used to retrieve a large number of relevant results that can then be ranked and indexed into a concept matrix. This new concept matrix can then be used to repeat the search, but this time with a more accurate and informed concept bridge generated search expression. This process can continue repeatedly until the quality of the results returned (measured by conceptual similarity) drops below a threshold.

Inasmuch as the concept bridge can adapt its search expression to the ranking subsystem of a search engine, it is advantageous for serving as a front end for a federated search. Search text is supplied by the user and customized search expressions are sent to each of the search engines being used. At the end the user can optionally download the documents and conceptually rank them to provide a unified result list.

The system and method as described herein can, therefore, create an expression employable by any index to perform an efficient search. As presently available, a set of keywords are formed into an expression for each index of a search engine. The system and method as disclosed herein creates (including inferring terms and phrases) an expression(s) employable by any index to perform a more efficient search.

The concept bridge, therefore, extracts representative terms from the search text and infers additional terms that are representative of the search text. The model that performs the aforementioned functions behaves similarly to how people associate terms based on similarity of meaning and context. The output of this process is a term association model that can judge the similarity between any two terms, a term and a document, or any two documents. Listed below are techniques for creating a term association model and an explanation therefor.

As mentioned above, latent semantic analysis builds a term by document matrix of weighted term frequencies and then compresses the document columns using singular value decomposition to produce a pseudo document vector for each term, which is also called a concept vector because it captures the latent pattern of document word usage around a concept. This compressed matrix as a whole is akin to a concept matrix. Each concept vector can be compared to any other vector to get term-term similarity and any document can be assigned a concept vector by a weighted average of the concept vectors for the words in the document. This document concept vector can then be used to generate similarity scores to terms or other documents.

Hyperspace analog of language is similar to latent semantic analysis except that it uses a sliding window to generate a term-to-term matrix that is compressed to get concept vectors for each term. These are then used in the same manner as latent semantic analysis to produce term-to-term, term to document, and document-to-document similarity. Additionally, a conceptual network graph builds a graph of nodes made from words and documents. The edges connecting the word and document nodes are the values in a normal weighted term document matrix. Queries are done by "energizing" nodes representing the query text and letting the energy seep into the network, dissipating as it progresses, until the graph reaches a steady state. The energy levels on words and documents then represent the output of the query. Thus, the term association models as described herein are akin to the concept matrix.

For a better understanding of search engines and other related engines, see U.S. Pat. No. 6,775,677, entitled "System, Method, and Program Product for Identifying and Describing Topics in a Collection of Electronic Documents," to Ando, et al., issued Aug. 10, 2004, U.S. Patent Publication No. 20030004942, entitled "Method and Apparatus of Metadata Generation," to Bird, published Jan. 2, 2003, U.S. Patent Publication No. 20040064438, entitled "Method for Data and Text Mining and Literature-Based Discovery," to Kostoff, published Apr. 1, 2004, U.S. Patent Publication No. 20020103799, entitled "Method for Document Comparison and Selection," Bradford, et al., published Aug. 1, 2002, U.S. Patent Publication No. 20040220944, entitled "Information Retrieval and Text Mining Using Distributed Latent Semantic Indexing," to Behrens, et al., published Nov. 4, 2004, U.S. Pat. No. 6,772,170, entitled "System and Method for Interpreting Document Contents," to Pennock, et al., issued Aug. 3, 2004, U.S. Patent Publication No. 20040059736, entitled "Text Analysis Techniques," to Willse, et al., published Mar. 25, 2004, U.S. Patent Publication No. 20040210443, entitled "Interactive Mechanism for Retrieving Information from Audio and Multimedia Files Containing Speech," to Kuhn, et al., published Oct. 21, 2004, U.S. Pat. No. 5,278,980, entitled "Iterative Technique for Phrase Query Formation and an Information Retrieval System Employing Same," to Pedersen, et al., issued Jan. 11, 1994, U.S. Patent Publication No. 20020103809, entitled "Combinatorial Query Generating System and Method," to Starzl, et al., published Aug. 1, 2002, which are incorporated herein by reference.

Also, although the present invention and its advantages have been described in detail, it should be understood that various changes, substitutions and alterations can be made herein without departing from the spirit and scope of the invention as defined by the appended claims. For example, many of the systems, subsystems and methodologies discussed above can be implemented in different methodologies and replaced by other related systems and subsystems, or a combination thereof, to advantageously form a concept bridge as described herein.

Moreover, the scope of the present application is not intended to be limited to the particular embodiments of the process, machine, manufacture, composition of matter, means, methods and steps described in the specification. As one of ordinary skilled in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. One or more computer-readable non-transitory storage media embodying software that is operable when executed by one or more computing devices to:
    derive a concept matrix from a plurality of sample documents using singular value decomposition of a term-document matrix, the concept matrix identifying a latent pattern of word usage in the plurality of sample documents around a concept;
    derive concept terms by extracting significant terms from search text and inferring relevant terms therefrom in accordance with the concept matrix; and
    generate a query comprising a search expression having at least one of the derived concept terms.

2. The media of claim 1, the software further operable when executed by the one or more computing devices to remove noise terms that are unrelated to said significant terms.

3. The media of claim 1 wherein said search text is selected from the group consisting of:
    a document,
    an e-mail, and
    a Web page.

4. The media of claim 1 wherein said concept matrix is built by employing a latent semantic analysis of information.

5. The media of claim 1, the software further operable when executed by the one or more computing devices to cluster concept terms in synonym groups with an operator therebetween.

6. The media of claim 1, the software further operable when executed by the one or more computing devices to generate said query conforming to a Boolean expression.

7. The media of claim 1 wherein the query is consistent with an index of a search engine.

8. A method comprising:
    by one or more computing devices, deriving a concept matrix from a plurality of sample documents using singular value decomposition of a term-document matrix, the concept matrix identifying a latent pattern of word usage in the plurality of sample documents around a concept;
    by the one or more computing devices, deriving concept terms by extracting significant terms from search text and inferring relevant terms from said significant terms in accordance with the concept matrix; and
    by the one or more computing devices, generating a query comprising a search expression having at least one of the derived concept terms.

9. The method as recited in claim 8 further comprising removing noise terms that are unrelated to said significant terms.

10. The method as recited in claim 8 wherein said search text is selected from the group consisting of:
    a document,
    an e-mail, and
    a Web page.

11. The method as recited in claim 8 wherein generating the query comprises clustering concept terms in synonym groups with an operator therebetween.

12. The method as recited in claim 8 wherein said query conforms to a Boolean expression.

13. The method as recited in claim 8 wherein the query is consistent with an index of a search engine.

14. One or more computer-readable non-transitory storage media embodying software that is operable when executed by one or more computing devices to:
    derive a concept matrix from a plurality of sample documents using singular value decomposition of a term-document matrix, the concept matrix identifying a latent pattern of word usage in the plurality of sample documents around a concept;
    derive concept terms by extracting significant terms from search text and inferring relevant terms therefrom using the concept matrix; and
    generate a first query for a first index of a first search engine and a second query for a second index of a second search engine, the first and second queries comprising at least one of the derived concept terms.

15. The media of claim 14, the software further operable when executed by the one or more computing devices to remove noise terms that are unrelated to said significant terms.

16. The media of claim 14 wherein said search text is selected from the group consisting of:
    a document,
    an e-mail, and
    a Web page.

17. The media of claim 14, the software further operable when executed by the one or more computing devices to cluster concept terms in synonym groups with an operator therebetween.

18. The media of claim 14, the software further operable when executed by the one or more computing devices to rank search results from at least one of said first and second search engines.

* * * * *